US011656887B2

(12) United States Patent
Willemain et al.

(10) Patent No.: US 11,656,887 B2
(45) Date of Patent: May 23, 2023

(54) SYSTEM AND METHOD TO SIMULATE DEMAND AND OPTIMIZE CONTROL PARAMETERS FOR A TECHNOLOGY PLATFORM

(71) Applicant: Smart Software, Inc., Belmont, MA (US)

(72) Inventors: Thomas Reed Willemain, Niskayuna, NY (US); Nelson Seth Hartunian, Belmont, MA (US)

(73) Assignee: Smart Software, Inc., Belmont, MA (US)

( * ) Notice: Subject to any disclaimer, the term of this patent is extended or adjusted under 35 U.S.C. 154(b) by 34 days.

(21) Appl. No.: 17/411,222

(22) Filed: Aug. 25, 2021

(65) Prior Publication Data

US 2022/0066802 A1 Mar. 3, 2022

Related U.S. Application Data

(60) Provisional application No. 63/070,867, filed on Aug. 27, 2020.

(51) Int. Cl.
*G06F 9/455* (2018.01)
*G05B 13/02* (2006.01)
*G05B 13/04* (2006.01)

(52) U.S. Cl.
CPC ......... *G06F 9/455* (2013.01); *G05B 13/0265* (2013.01); *G05B 13/042* (2013.01); *G05B 13/048* (2013.01)

(58) Field of Classification Search
CPC ... G06F 9/455; G05B 13/0265; G05B 13/042; G05B 13/048
See application file for complete search history.

(56) References Cited

U.S. PATENT DOCUMENTS

2019/0317829 A1* 10/2019 Brown .................. G06F 9/5077

OTHER PUBLICATIONS

Rai et al. "Modeling Customer Demand In Print Service Environments Using Bootstrapping", 2015 (Year: 2015).*

(Continued)

*Primary Examiner* — Rehana Perveen
*Assistant Examiner* — Troy A Maust
(74) *Attorney, Agent, or Firm* — Hoffman Warnick LLC (57) ABSTRACT

A system and method are presented for optimizing choices of control parameters. A method includes collecting demand sequences each associated with a resource managed by a technology platform; processing a demand sequence for a resource to calculate an optimized control parameter (CP) value set to manage an automated process within the technology platform, wherein calculating includes: processing the demand sequence with an advanced bootstrap process to generate a collection of bootstrapped demand sequences; processing the bootstrapped demand sequences with a performance prediction process that models the automated process to predict a performance metric for an initially selected CP value set; identifying a neighborhood of CP value sets that includes neighbors and the initially selected CP value set; predicting the performance metric for each neighbor with the performance prediction process; and identifying from the neighborhood of CP value sets the optimized CP value set that provides a best performance metric.

17 Claims, 10 Drawing Sheets

(56) References Cited

OTHER PUBLICATIONS

Arhami et al. "Predicting hourly air pollutant levels using artificial neural networks coupled with uncertainty analysis by Monte Carlo simulations", 2013 (Year: 2013).*
Osypanka et al. "Resource Usage Cost Optimization in Cloud Computing Using Machine Learning", Aug. 11, 2020 (Year: 2020).*
Tiwari et al. "Urban water demand forecasting and uncertainty assessment using ensemble wavelet-bootstrap-neural network models", 2013 (Year: 2013).*
Selman et al. "Hill-climbing Search", Encyclopedia of cognitive science, 2006 (Year: 2006).*
Wilt et al. "A Comparison of Greedy Search Algorithms", Association for the Advancement of Artificial Intelligence, 2010 (Year: 2010).*
Chen et al. "Electricity Price Forecasting With Extreme Learning Machine and Bootstrapping" IEEE Transactions on Power Systems Nov. 2012 (Year: 2012).*
Geeks for Geeks "Introduction to Hill Climbing | Artificial Intelligence", Retrieved from the Internet Archive https://web.archive.org/web/20200821074003/https://www.geeksforgeeks.org/introduction-hill-climbing-artificial-intelligence/, Archive dated Aug. 21, 2020 (Year: 2020).*

\* cited by examiner

|   | A | B | C | D | E | F | G | H |
|---|---|---|---|---|---|---|---|---|
| 1 |   |   |   |   | Augmented Atoms | | | |
| 2 |   |   |   |   | 1st added | 2nd added | 3rd added | row sum |
| 3 | demand | 0 | 1 | 5 | 9 | 10 | 15 |   |
| 4 | count | 250 | 20 | 100 | 1 | 1 | 1 |   |
| 5 | pmf | 0.670 | 0.054 | 0.268 | 0.003 | 0.003 | 0.003 | 1.000 |
| 6 | cdf | 0.670 | 0.724 | 0.992 | 0.995 | 0.997 | 1.000 |   |
| 7 | cut point | 0.441 | 0.594 | 2.407 | 2.552 | 2.784 |   |   |
| 8 | old mean | 1.445 |   |   |   |   |   |   |
| 9 |   |   |   |   |   |   |   |   |
| 10 | shift | 2.158 |   |   |   |   |   |   |
| 11 | new cdf | 0.043 | 0.059 | 0.598 | 0.653 | 0.735 | 1.000 |   |
| 12 | new pmf | 0.043 | 0.016 | 0.539 | 0.055 | 0.081 | 0.265 | 1.000 |
| 13 | new mean | 8.000 |   |   |   |   |   |   |
| 14 |   |   |   |   |   |   |   |   |

SYSTEM AND METHOD TO SIMULATE DEMAND AND OPTIMIZE CONTROL PARAMETERS FOR A TECHNOLOGY PLATFORM

BACKGROUND OF THE INVENTION

Technical Field

The present invention relates generally to a system and method that simulates demand and automatically optimizes control parameters for an automated process in a technology platform.

Background

Understanding and planning for future demand of resources within a technology platform is critical for an efficient and cost-effective outcome. In many cases, the technology platform includes an automated process that relies on a set of control parameters to manage the resources. For example, the control parameters may be utilized to dictate when additional resources should be obtained, how many additional resources are required, etc.

Illustrative platforms and their associated resources may for example include: cloud computing systems having resources such as distributed processors, memory and hardware resources; network platforms such as the Internet that deploy web resources; communication networks having resources such as switches, cell towers, routers; virtual computing platforms that provide virtual resources to endpoints; autonomous systems that deploy fleets of self-driving vehicles, robots and drones; Internet of Things (IoT) platforms that manage remote devices; manufacturing platforms that utilize automated control systems; energy management systems having energy resources such as solar cells and windmills; inventory control systems that manage stock keeping units (SKU) identifiers; enterprise resource planning (ERP) systems, etc. Automated processes running within the platform may for example include systems that allocate resources, deploy resources, load balance resources, obtain resources, manage resources, etc.

SUMMARY OF THE INVENTION

A system and method are presented for optimally selecting control parameter values based on historical demand of resources in order to manage an automated process in a technology platform.

Aspects of the invention include: an advanced bootstrap process that converts a single observed sequence of demand observations into an unlimited number of statistically equivalent demand scenarios, i.e., sequences; a performance prediction process that executes Monte Carlo simulations of a proposed system design (e.g., a model of an automated process using selected control parameter values) to assess its performance; and a performance improvement process that uses the performance prediction process to automatically explore the space of alternative system designs to identify optimal control parameter values, selecting ones that provide the best performance, e.g., minimizing operating cost while guaranteeing a certain level of availability.

In one aspect, a system is provided comprising: a memory and a processor coupled to the memory and configured to process demand data for a set of resources according to a method that includes: collecting demand sequences, wherein each demand sequence is associated with a resource managed by a technology platform; processing a demand sequence for a selected resource to calculate an optimized control parameter (CP) value set adapted to manage an automated process within the technology platform, wherein calculating the optimized CP value set for the selected resource includes: processing the demand sequence to generate a collection of bootstrapped demand sequences; processing the bootstrapped demand sequences with a performance prediction process that models the automated process to predict a performance metric for an initially selected CP value set; identifying a neighborhood of CP value sets that includes neighbors and the initially selected CP value set; predicting the performance metric for each neighbor with the performance prediction process; and identifying from the neighborhood of CP value sets the optimized CP value set that provides a best performance metric.

In a further aspect, a method is provided that includes collecting demand sequences, wherein each demand sequence is associated with a resource managed by a technology platform; processing a demand sequence for a selected resource to calculate an optimized control parameter (CP) value set adapted to manage an automated process within the technology platform, wherein calculating the optimized CP value set for the selected resource includes: processing the demand sequence with an advanced bootstrap process to generate a collection of bootstrapped demand sequences; processing the bootstrapped demand sequences with a performance prediction process that models the automated process to predict a performance metric for an initially selected CP value set; identifying a neighborhood of CP value sets that includes neighbors and the initially selected CP value set; predicting the performance metric for each neighbor with the performance prediction process; and identifying from the neighborhood of CP value sets the optimized CP value set that provides a best performance metric.

In yet another aspect, a method for processing demand data for a set of resources in a technology platform is provided, comprising: collecting demand sequences, wherein each demand sequence is associated with a resource managed by a technology platform; processing a demand sequence for a selected resource to calculate an optimized control parameter (CP) value set usable as inputs to manage an automated process within the technology platform, wherein calculating the optimized CP value set for the selected resource includes: processing the demand sequence to generate a collection of bootstrapped demand sequences; processing the bootstrapped demand sequences with a performance prediction process that models the automated process to predict an associated performance metric for an initially selected CP value set; and utilizing the initially selected CP value set and the associated performance metric as an initial solution to selectively search an N-dimensional solution space for an optimal solution, wherein N is a number of control parameters in the solution space.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

DETAILED DESCRIPTION

Aspects of the present invention provide technical solutions for analyzing historical demand data of resources in a technology platform to facilitate management of an automated process in the platform. In any automated process involving the management of resources, there exist competing requirements, e.g., speed versus cost, performance versus quality, etc., which must be balanced to achieve the most optimized result. Often, the required balance is between the competing imperatives of ensuring resource availability and minimizing costs associated with maintaining excess capacity. In various implementations, a system and method are provided that determines the balance based on a set of N control parameters. In certain cases, control parameters may be implemented as a pair of values, e.g., (Reorder Point, Order Quantity), (min, max), etc. The optimal choices for these parameter values depend on multiple factors, e.g., the average level of resource demand, the variability of demand, the average and variability of replenishment lead times from suppliers, and the costs of holding unused resources, ordering replenishments, and failing to satisfy required demand. The types of demand issues may depend on the particular domain associated with the platform. In many such technology platforms, the sheer scale of the problem requires an automated decision process.

As provided herein, predicted performance for a given resource is automatically determined by applying a Monte Carlo simulation to the demand sequences associated with the resource. To deal with the scale required in many platforms, the simulation process automatically searches for optimal parameter values. Further, to deal with the complicated patterns of real-world demand, the simulations are driven by inputs that represent the idiosyncratic nature of the demand for individual resources.

It is understood that the approaches described herein could be utilized to process and manage demand data associated with resources in any type of technology platform. Resources could for example include computing resources, energy consumers or producers, web resources, communication resources, physical or virtual components, autonomous vehicles, spare parts, stock keeping units (SKUs), financial resources, etc. In some cases, the described approaches could be utilized for analyzing demand data of cloud computing resources, energy grid usage, communication resources, etc. In other cases, the approach could be utilized for enterprise resource planning (ERP) systems that process information to control inventory and manage supply chains, etc.

Figure 1:
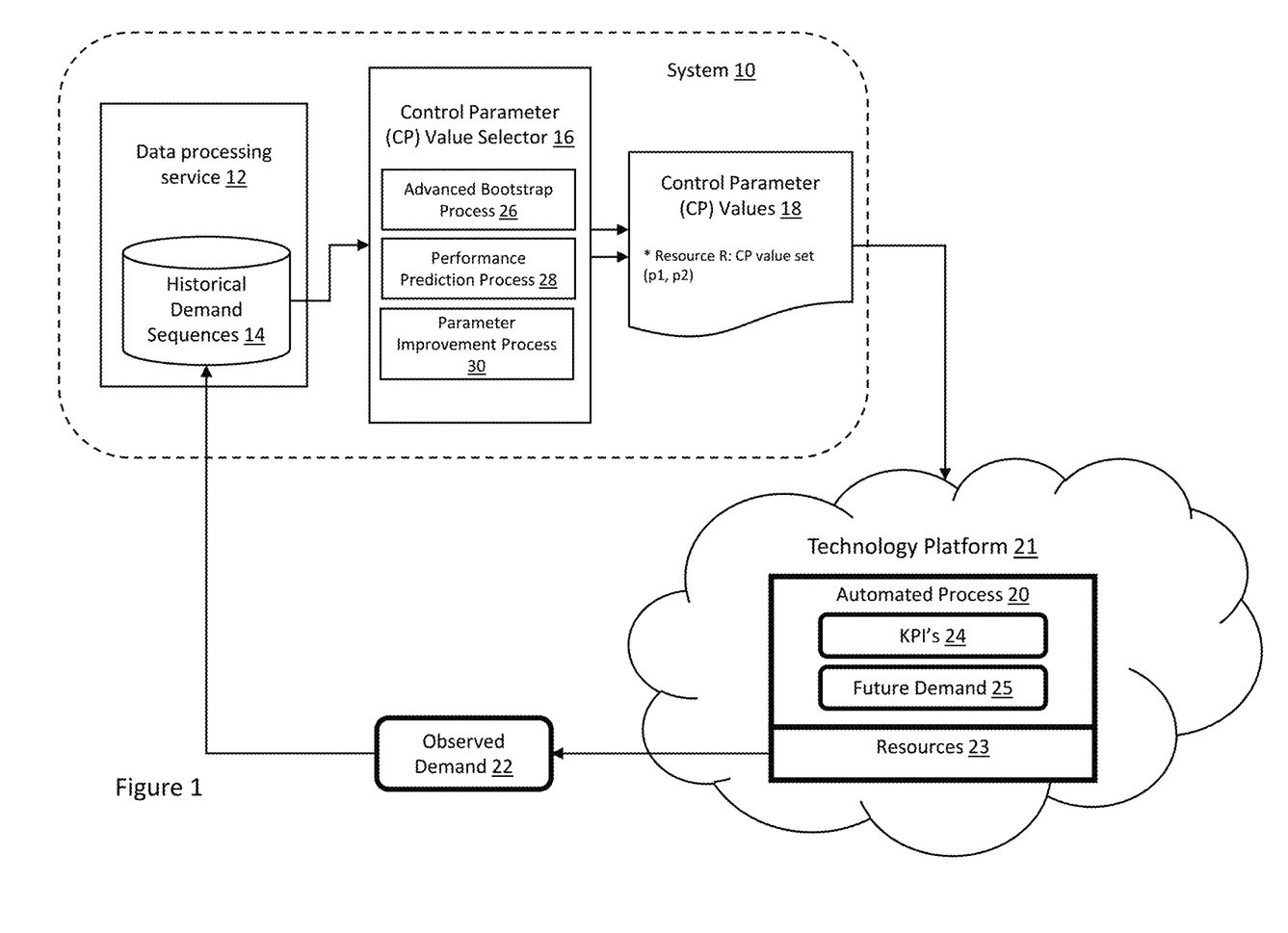
FIG. 1 depicts a system for generating control parameter values in accordance with an embodiment of the invention.

FIG. 1 depicts a demand processing system 10 that generates control parameter (CP) values 18 for facilitating management of a technology platform 21. In certain embodiments, the platform 21 includes an automated process 20 that plans for future demand 25, and whose performance (e.g., as measure by performance metrics such as key performance indicators, KPI's 24) is dictated by the inputted set of control parameter (CP) values 18. Automated process 20 may include any system that plans for future demand of resources 23 and is controlled by a set of control parameters, e.g., a control system, a machine learning system, an inventory management service, etc.

Demand processing system 10 generally includes a data processing service 12 that stores and/or provides access to historical demand sequences 14 of resources managed by technology platform 21. As noted, resources 23 may for example include cloud computing resources, energy requirements in a power grid, communication resources, web resources, items controlled by an inventory management system, etc. As resources 23 within the technology platform 21 are consumed, their observed demand 22 is tracked and captured by the data processing service 12 and recorded as historical demand sequences 14. The historical demand sequences 14 are then used to calculate control parameter (CP) values 18, which, e.g., help manage future demand 25. To achieve this, system 10 further includes a CP value selector 16 that reads in a historical demand sequence 14 for a given resource and generates a CP value set for the resource, which is then used to manage the automated process 20. In some instances, CP values 18 are selected to maximize KPI's 24 of the automated process 20 with respect to future demand 25 of the resources 23. KPI's 24 may for example include cost, performance, savings, usage, etc.

Depending on the implementation, the number and type of control parameters may vary. In the examples provided herein, two (N=2) control parameters are utilized, but it is understood that more or fewer control parameters may be implemented. Further, the control parameters can be used to manage or control any aspect of an associated resource. In some instances, control parameters may be of the "continuous review" type, in which the control parameters involve values such as, e.g., (CPU Speed, CPU Delay), (Data Compression Rate, Compression Time), (Reorder Point, Order Quantity), (Min, Max). In other instances, the control parameters may be of a "periodic review" type, in which the control parameters involve parameters such as (Review Interval, Order-up-to Level).

As noted, the control parameters directly impact the performance of the of the automated process. For example, the selection of control parameter values 18 can impact performance metrics, i.e., KPI's 24) such as "availability" and "cost." Resource availability metrics might include indicators such as "service level" and "supply rate" that describe the chance that a request can be filled immediately or at a future point in time from an existing supply of resources. Illustrative cost parameters might include indicators such as "investment required" and "operating cost" that describe the burden of providing a given level of resource availability.

In some instances, a goal of the automated process 20 is to provide an optimal balance between the cost of maintaining resources 23 and the benefits of having excess resources 23 available. Without a system 10 for automatically determining the CP values 18, a manual process must be implemented, e.g., involving ad hoc field experiments, i.e., first "guestimate" values of the parameters that might improve operations and then wait, e.g., weeks or more to see whether those guesses were good. The challenge of determining CP values 18 is further exacerbated by the fact that technology platforms often have large numbers of resources 23 being tracked and managed by the automated process 20. Accordingly, such a manual approach is impractical.

To overcome this technical problem, the present approach provides an automated solution to determine CP values 18 without ad hoc field experiments. This automated solution provides a process that proposes and evaluates different CP values 18 for a selected resource to identify an optimal solution, thereby eliminating guesswork. Further, proposed parameter values for a resource will be evaluated not just based on observed demand 22, but for a full spectrum of alternative but realistic demand patterns, thus allowing the proposed parameter values to be "stress tested."

In the depicted embodiment, system 10 is configured to determine a pair of CP values, i.e., a CP value set (p1, p2), for each resource. The CP value set (p1, p2) for a selected resource R is fed to the automated process in the technology platform 21 to effectuate management of the selected resource R going forward. The process can be implemented for each resource as needed, on a rolling basis, in a batch mode, etc. For example, a cloud computing platform may need to determine an optimal number of dedicated servers required in a data center to provide virtual private networks for a set of contracted clients. In one example, system 10 may determine a minimum and a maximum amount of server capacity as the CP parameters.

In the example embodiment shown in FIG. 1, the proposed CP value selector 16 has three components:
1. An advanced bootstrap process 26 that converts a resource's observed demand sequence into an unlimited number of statistically indistinguishable but non-identical bootstrapped demand sequences.
2. A performance prediction process 28 that predicts the performance of the automated system driven by a demand sequence generated by the bootstrap process 26, as determined by the choice of control parameters and other aspects of problem context (such as how long it takes for suppliers to fulfill replenishment resources when available resource levels fall dangerously low).
3. A parameter improvement process 30 that uses the outputs of the performance prediction process 28 to automatically select optimized values of the control parameters to identify the best performance metric(s), such as minimizing the operating cost subject to a constraint on the minimum acceptable value of a service level.

Figure 2:
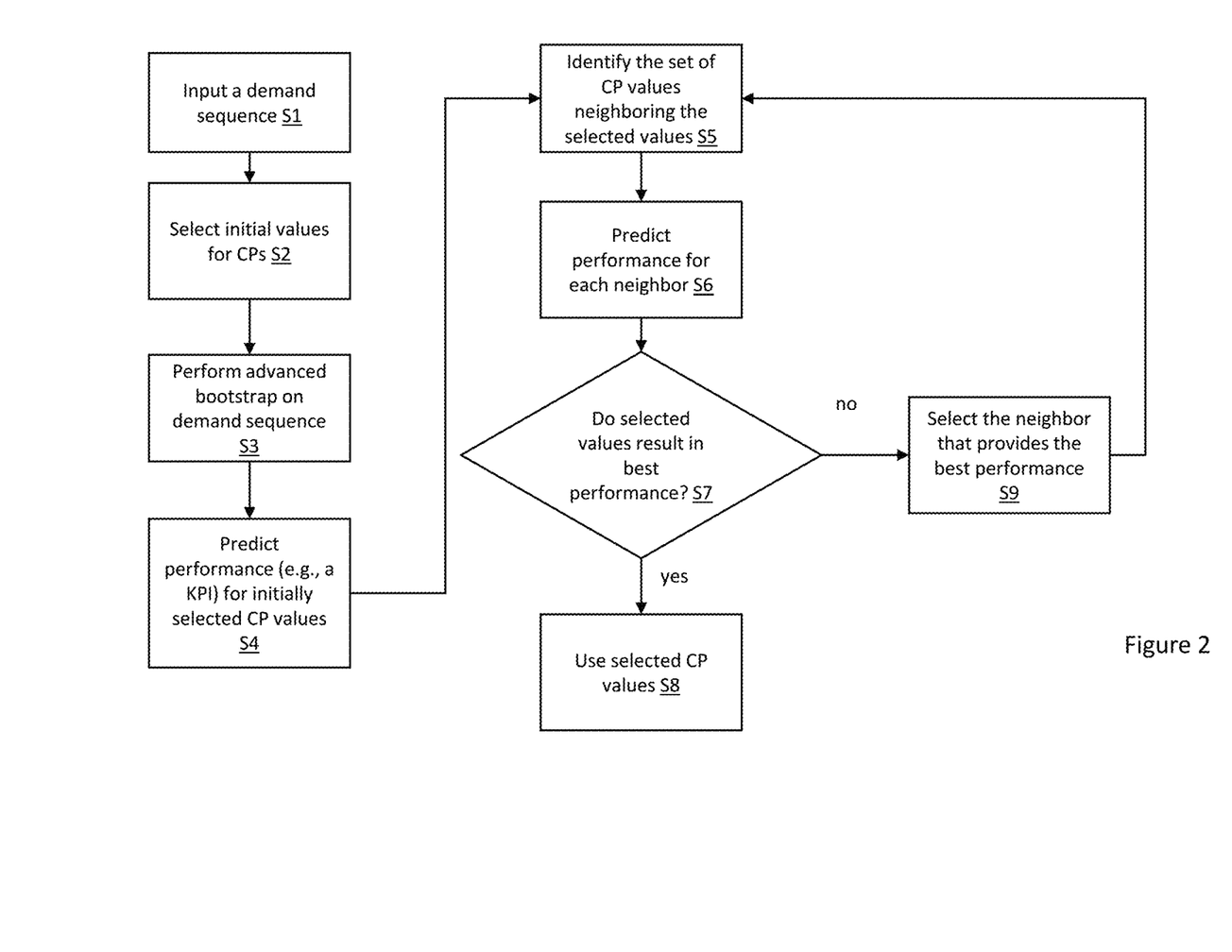
FIG. 2 depicts a flow diagram of a method of generating control parameter values in accordance with an embodiment of the invention.
Figure 3:
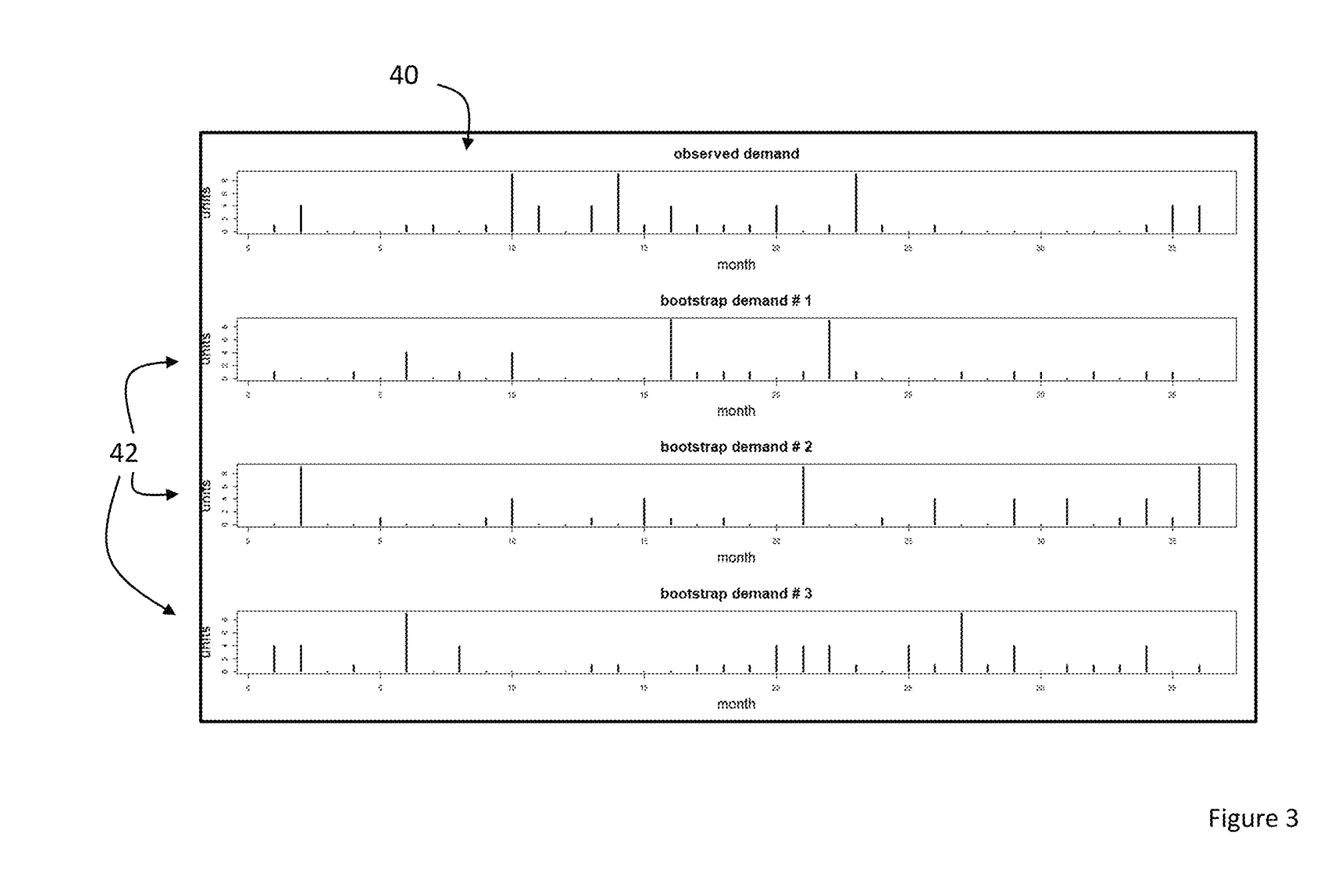
FIG. 3 depicts an example of observed demand and three replicates produced by the advanced bootstrap process in accordance with an embodiment of the invention.

FIG. 2 depicts an illustrative flow diagram of a process of implementing CP value selector 16 (FIG. 1). At S1, a demand sequence for a resource is inputted, and at S2 an initial CP value set is selected, e.g., p1=4, p2=6. The initial CP value set may be selected in any manner, e.g., randomly, based on historical data, etc. At S3, the advanced bootstrap process 26 is applied to the demand sequence. The advanced bootstrap process 26 converts a single observed sequence of demand observations into an unlimited number of statistically equivalent sequences. For example, FIG. 3 shows an observed sequence of 36 monthly demand values 40 in units on the top (i.e., the "original data") and samples of three synthetic replicates (i.e., bootstrapped demand sequences) 42 that differ in detail but match the overall character of the observed data. Note that while the embodiments are described herein using an advanced bootstrap process 26, it is understood that CP value selector 16 may be implemented with other types of bootstrap processes.

The bootstrap is a statistical technique that inputs observed data and outputs similar data in essentially unlimited quantities. It does this by resampling the original data with replacement. Thus, the sequence {0, 1, 2, 3} might produce the bootstrapped sequences {0,1,0,1}, {3,2,1,1}, {3,0,0,2}, etc. Each of the replacement sequences include only those values from the original sequence, but in a different arrangement. In simple embodiments, existing bootstrapping methods (e.g., the Smart-Willemain method, disclosed in U.S. Pat. No. 6,205,431 B1, which is hereby incorporated by reference) can perform this operation directly, as just described. In other implementations however, a simple bootstrap process cannot effectively accommodate more complex demand patterns characterized by seasonality and/or trends. Seasonality becomes an obstacle when the observations are collected daily or even more frequently. For example, demand may be "stably random" at the weekly or monthly level of aggregation but at the daily level, effects such as operational shutdowns on weekends require that bootstrap samples reflect the difference between weekdays and weekends. Even at the monthly level, if resources are tied to a product or service whose demand is seasonal, the demand will inherit that seasonality. Seasonality can be accommodated, for example, by resampling separately from weekday data and weekend data.

Much more difficult is accommodating trending data within the bootstrap process. In one approach, an advanced bootstrap solution is provided that divides the problem of dealing with trend into two parts: dealing with a "mild" trend and dealing with a "strong" trend. A mild trend is defined to be one that will take the mean value up or down but not beyond the range of values previously recorded. For example, suppose the past demand values for a resource range from 0 to 4 with an average value of 2.7. If the trend will move the average up to 3.1, which is less than 4, this trend is classified as mild. But if the trend will increase the mean to 6.8, it is a strong trend. (The definition of "strong" may require a small safety zone below the largest observed value. Otherwise, the bootstrap samples will have too little variety as they crowd up against the largest observed value.)

The bootstrap generally works by resampling observed data with resampling probabilities equal to the frequency of each value in the sample. For instance, if there are 365 daily observations and 100 of them are zeros, the bootstrap samples would have 100/365 of their values be zero. Likewise, if there are only 15 instances of seven in the original dataset, bootstrap replicates would have 15/365 of their values be sevens. To increase the mean value in the bootstrap replicates, the mix can be changed to, e.g., generate fewer zeros and more sevens.

One approach for achieving this "reweighting of the resampling probabilities" is to separately calculate new resampling probabilities for every unique value in the original data, being sure that the revised probabilities sum to unity. But if there are, e.g., 20 unique values in the original data, the problem needs to be solved 20 times.

A further approach, which uses a more efficient process is explained with reference to FIG. 4. The bottom left panel 50 of FIG. 4 displays the probability distribution of demand values in the original data. There are eight unique values, ranging from 0 to 40, with 0 and 10 occurring most frequently. The mean demand for this distribution is 5.4 units. The bottom right panel 52 shows the reweighted probability distribution required to yield a target mean distribution of 34 units. The smaller values {0, 1, 5, 10} are much less frequent in the bootstrap samples, where about 60% of the values are 40's and about 25% are 25's.

Figure 4:
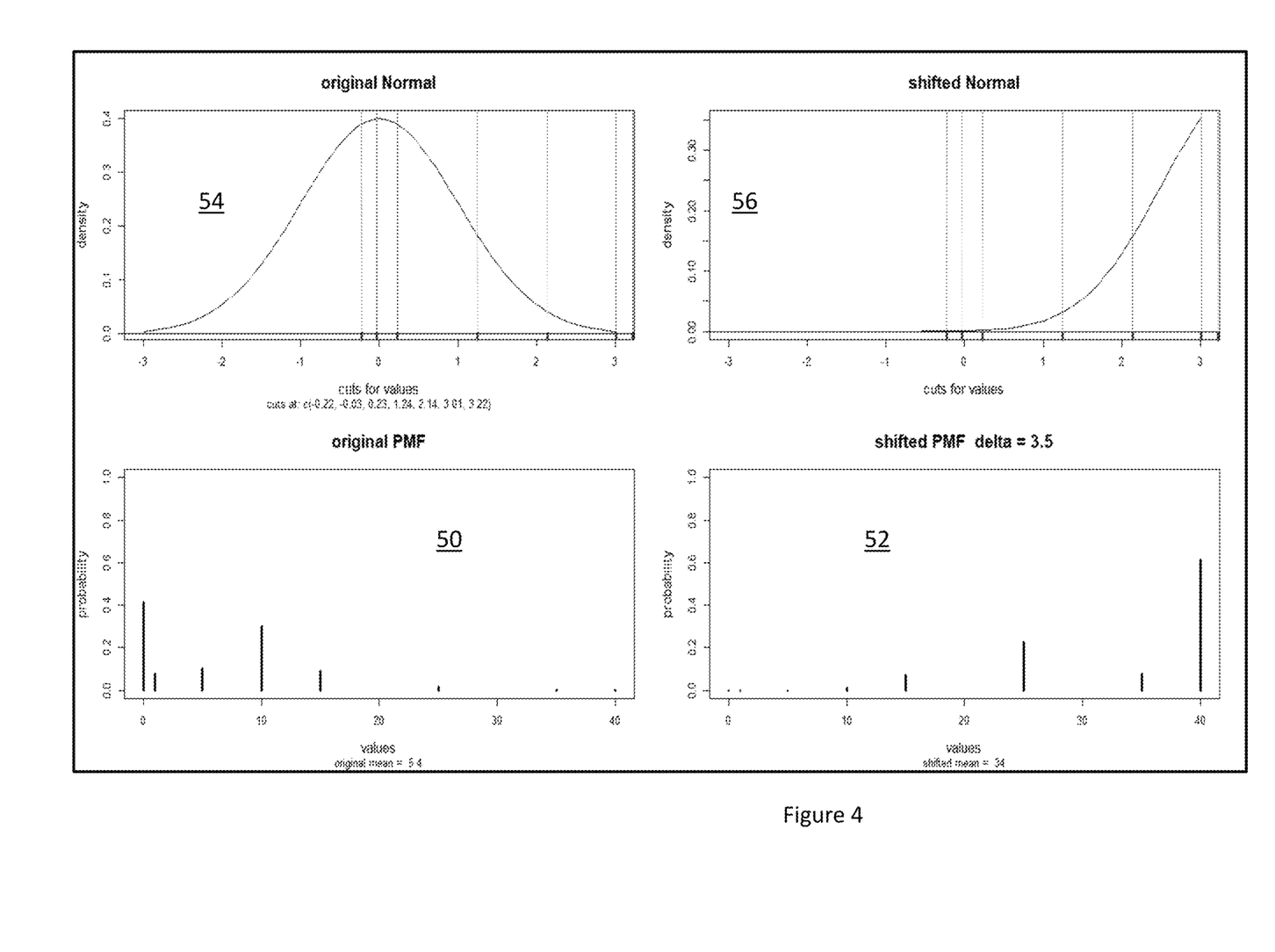
FIG. 4 shows a sliding Normal approach of changing resampling probabilities to account for mild trends in demand in accordance with an embodiment of the invention.

Shifting from the original distribution with mean 5.4 to the forecasted distribution with mean 34 requires the steps shown in the two top panels 54, 56 of FIG. 4. In the top left panel 54, the original probability distribution is used to determine "cut points" in a standard Normal distribution, shown as vertical lines. (Other distributions could be used in place of the Normal, such as the logistic.) For instance, 41% of the original data are zeros, so the Normal distribution is cut at −0.22, which is the $41^{st}$ percentile of the standard Normal distribution. Similar cut points are chosen to match all the other probabilities in the original distribution. Then the entire standard Normal distribution is shifted to the right by an amount that produces new resampling probabilities, whose combined effect is to achieve the desired new mean value of 34. The amount of the shift is computed by a simple one-dimensional root search using any standard method, such as Golden Section search. Thus, one routine calculation replaces the eight separate calculations required in a process focused on each demand value separately. This process of changing the resampling probabilities to track a mild trend is referred to herein as "shifting."

The process shown in FIG. 4 clearly cannot yield a new mean demand higher than the highest observed original value, so a secondary process is provided to deal with strong trends. The proposed secondary process addresses this problem by adding new, as-yet-unseen, values to the beginning or end of the demand distribution as appropriate (e.g., positive trends may require new values added to the right). This secondary process of adding new values is referred to herein as "augmenting."

Figure 5:
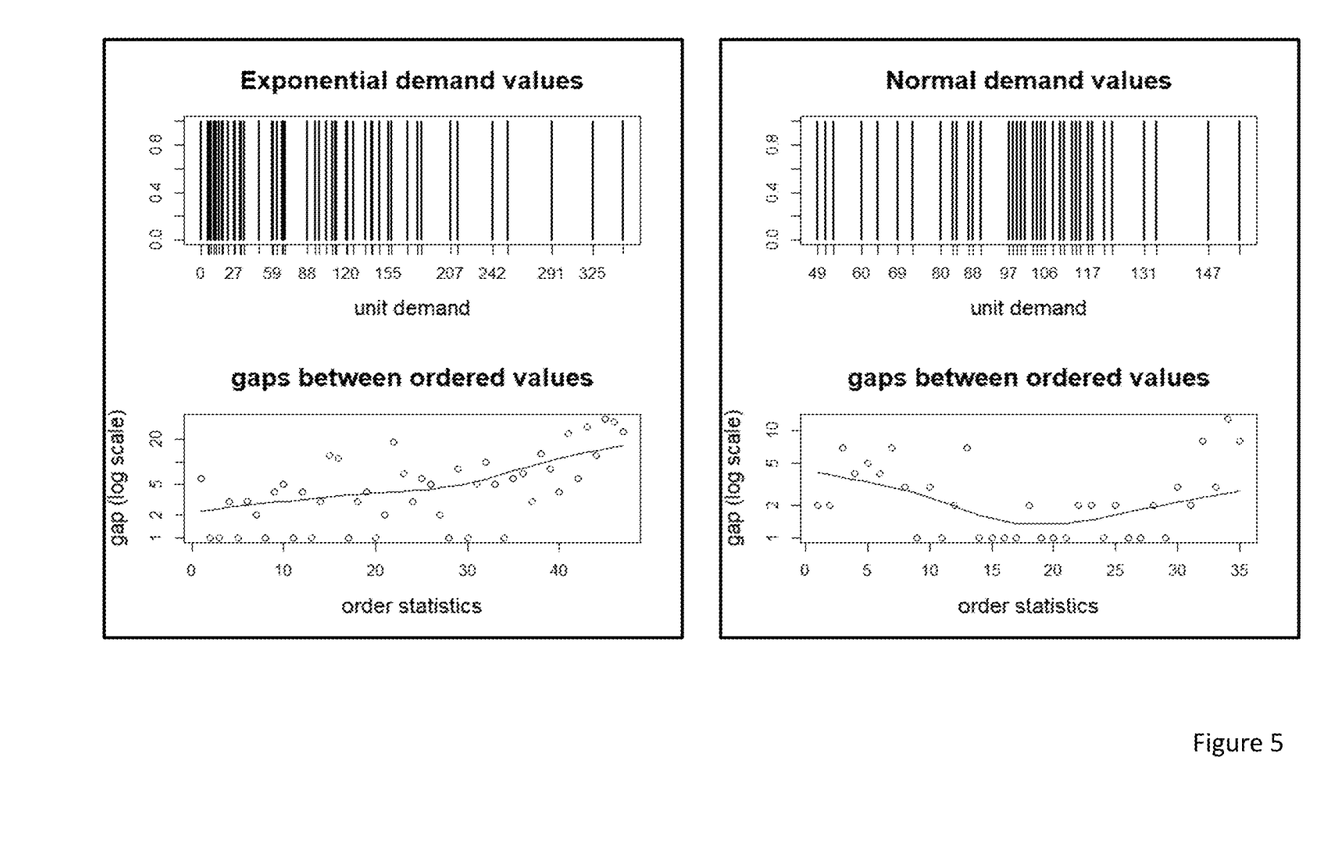
FIG. 5 shows the gaps between successive demand values, which form the basis for a demand augmentation process of accommodating strong trends in demand in accordance with an embodiment of the invention.

However, for the bootstrap replicates to retain the character of the actual data, the new values must "blend in" with the patterns already present in the data. For many demand distributions, the gaps between successive large values tend to increase, and likewise on the lower end if the lower end is not zero. FIG. 5 illustrates this with samples of 50 observations drawn from two theoretical distributions. In the left panel, the data comes from an asymmetric distribution, the exponential. Note that the spacing between successive values tends to increase. The right panel shows data from a symmetric distribution, the Normal. In this case, the gaps grow larger on both ends. The advanced bootstrap process 26 replicates this behavior by adding as-yet-unseen demand values at one or both ends of the observed distribution in such a way to mimic this spacing behavior.

Figure 6:
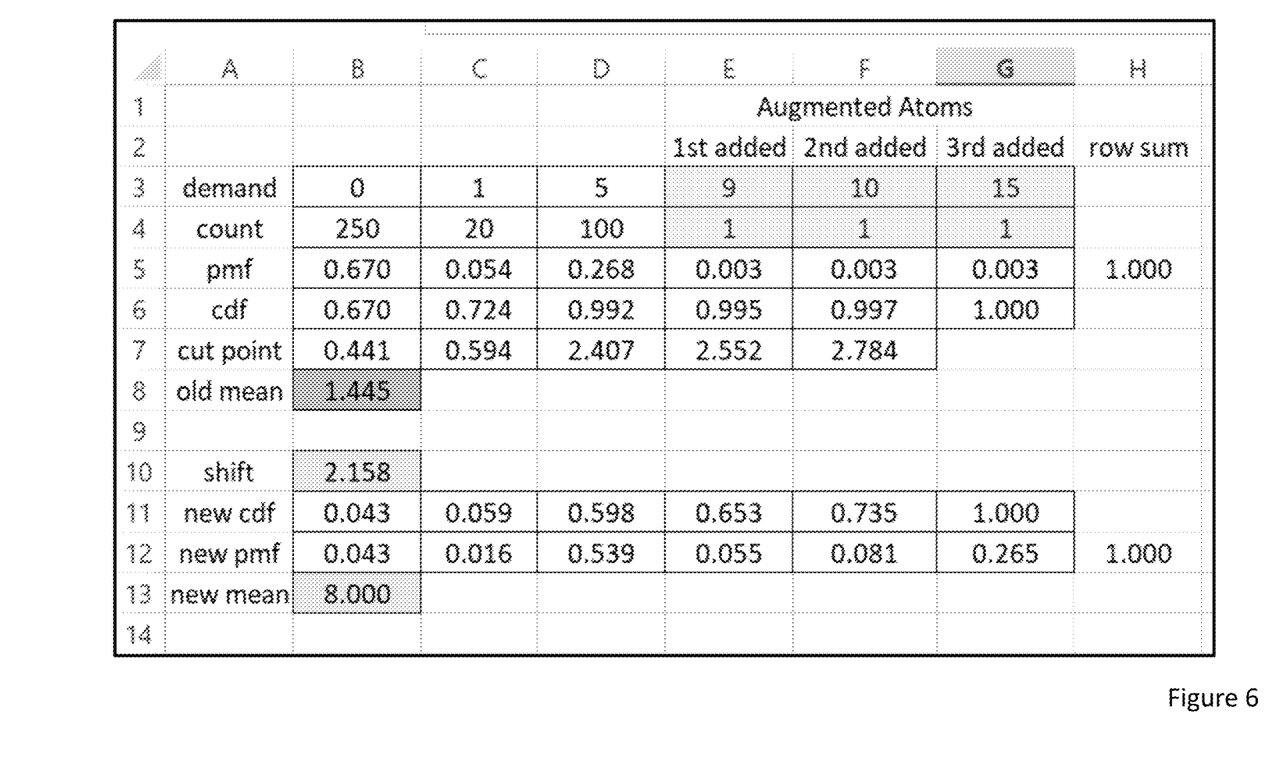
FIG. 6 depicts a process of calculating an augmented and shifted distribution to accommodate for a strong trend in accordance with an embodiment of the invention.

FIG. 6 illustrates the combination of "shifting" and "augmenting". The original demand observations consisted of 370 observations: 250 zeros, 20 ones and 100 fives (cells B4:D4). The average of these demands was 1.445 units (cell B8). A strong trend is projected (using Poisson regression against time or a similar technique) to create a future mean demand of 8.000 units (cell B13). To be able to create bootstrap demand scenarios with a mean of 8, the demand distribution is augmented.

Based on gaps of 4=5−1 units and 5=5−0 units, augmentation adds new demand values at 9=5+4, 10=5+5 and 15=10+5. These values are given nominal counts of 1 unit, resulting in a slightly modified demand distribution (cells B5:G5 or equivalently cells B6:G6). Cut points are estimated to map these probabilities into equivalent areas under the standard Normal curve (cells B7:F7). Finally, by shifting the center of the Normal distribution right by 2.158 units (cell B10), a new demand distribution (cells B12:G12 or equivalently cells B11:G11) is provided. The new demand distribution has the desired mean of 8.000 units.

Figure 7:
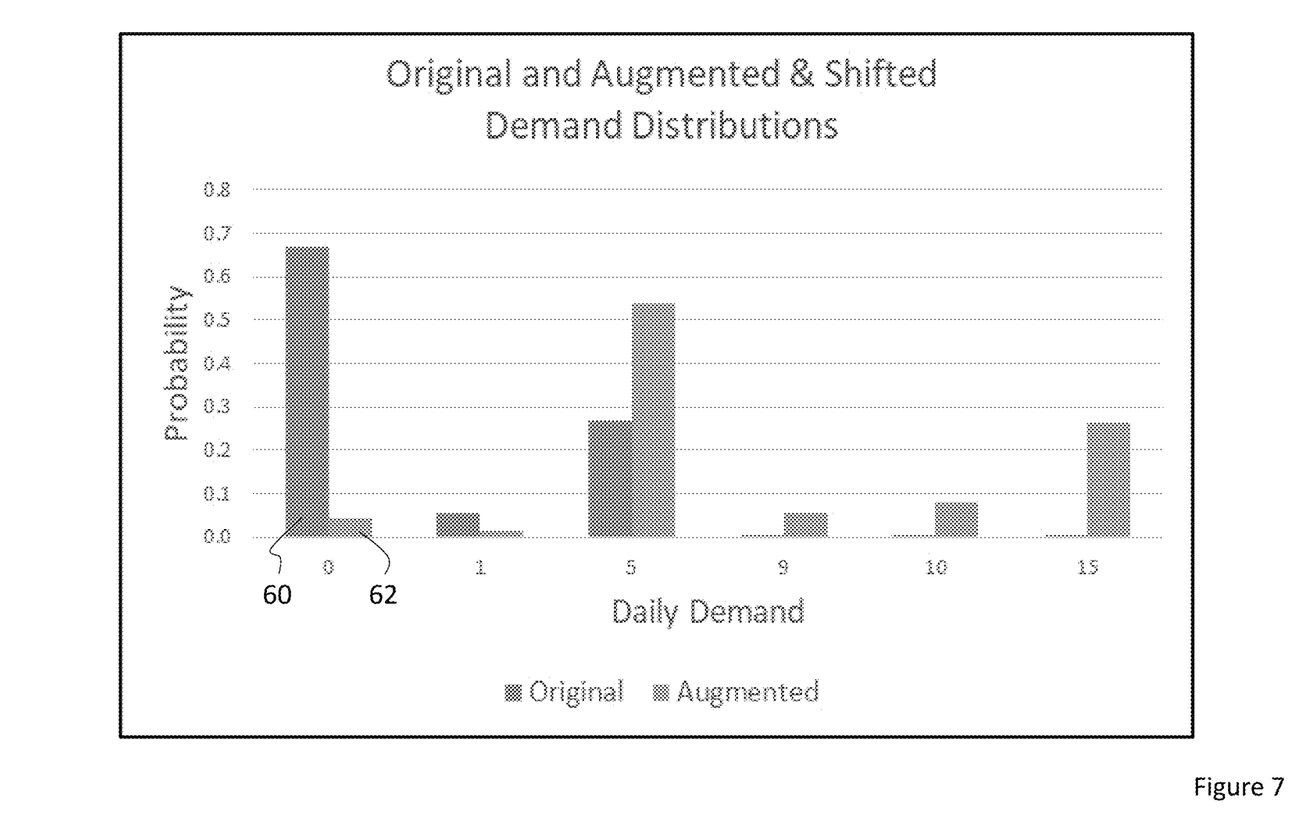
FIG. 7 shows a comparison of an observed distribution and the distribution after shifting and augmentation in accordance with an embodiment of the invention.

FIG. 7 plots the original distribution in left bars 60 and the shifted and augmented distribution in the right bars 62 for each daily demand value (i.e., 0, 1, 5, 9, 10, 15). Whereas about 27% of the original data were fives (cell D5 in FIG. 6), the shifted and augmented distribution has 54% fives (cell D12) and about 40% of the shifted and augmented distribution are nines, tens and fifteens.

Referring again to FIG. 2, once the initial CP value set (p1, p2) is selected at S2, the advanced bootstrap process 26 generates a sufficiently large number (e.g., several hundreds or thousands) of bootstrapped demand sequences at S3. These sequences are analyzed by modeling the automated process 20 at S4 to predict performance for the initial CP value set.

An example involving SKU's that, e.g., represent spare parts inventories stored in an automated or robotic warehouse might have two control parameters, Reorder point p1 and Order Quantity p2. In this example, a Reorder Point of 11 and an Order Quantity of 12 are selected as the initial CP value set (shown as entry 70). Any process may be utilized to select the initial value set. At S4, performance, i.e., one or more KPI's associated with the selected CP value set (11, 12) are predicted. In one illustrative approach, predictions are made using a Monte Carlo simulation model of the automated process 20. In one approach, the key variable in the simulation can be the daily number of available resources. In the case of, e.g., SKUs in an inventory control system, the core equation of the model may be given by: Inventory at end of day=Inventory at start of day+replenishments arriving during the day−units demanded during the day.

Figure 8:
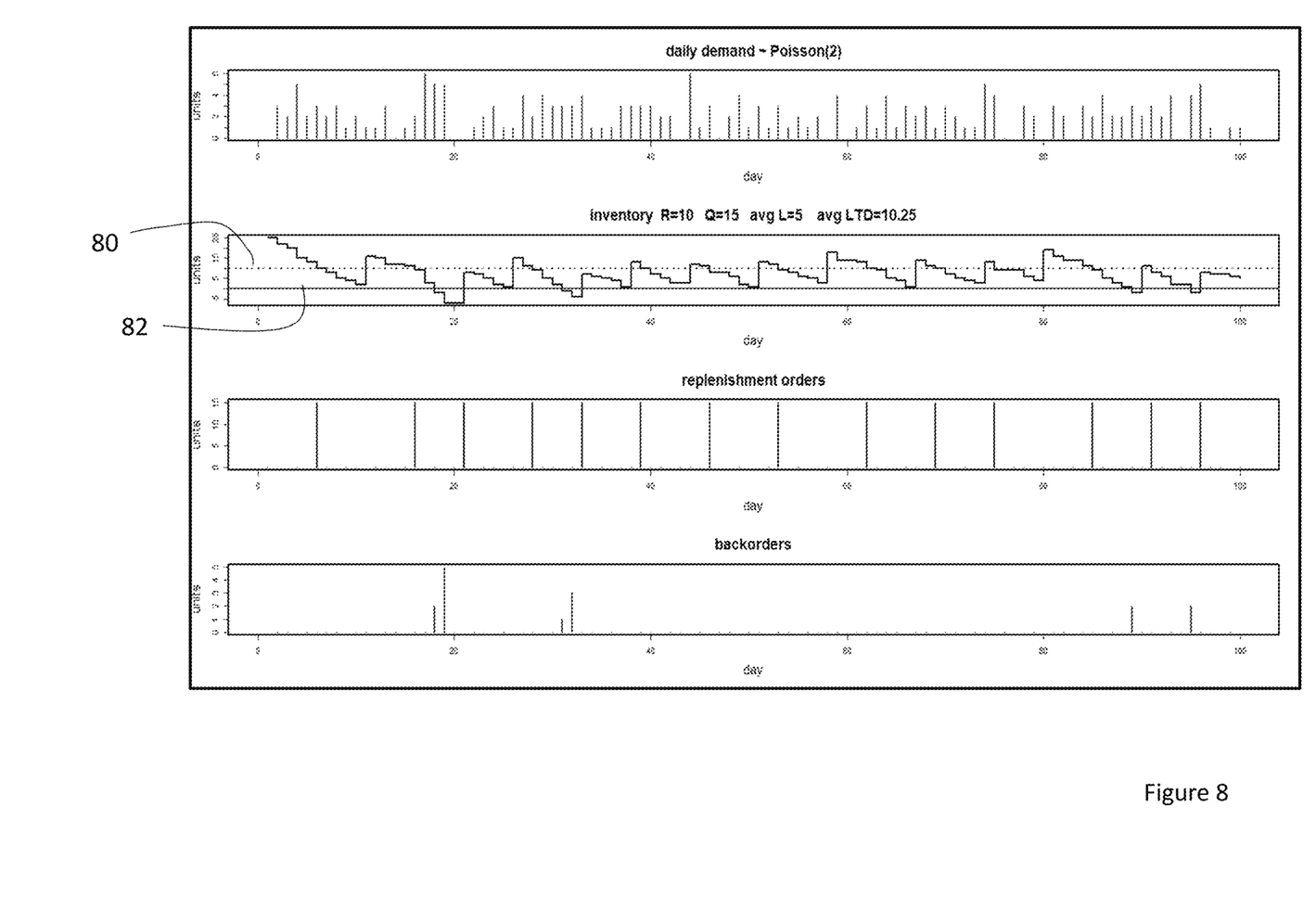
FIG. 8 details a simulation of an automated system operating in accordance with an embodiment of the invention.

FIG. 8 shows an example of the supply dynamics. The top panel shows 100 days of a scenario of daily item demand, created by the advanced bootstrap process 26. The second panel shows the daily level of on-hand resource inventory. The dotted line 80 indicates the Reorder Point. The solid line 82 indicates zero inventory. Inventory below zero represents a stockout, which creates backorders. The third panel shows daily replenishment orders, which are triggered when on-hand inventory drops to or below the Reorder point. The fourth panel shows backorders.

Figure 9:
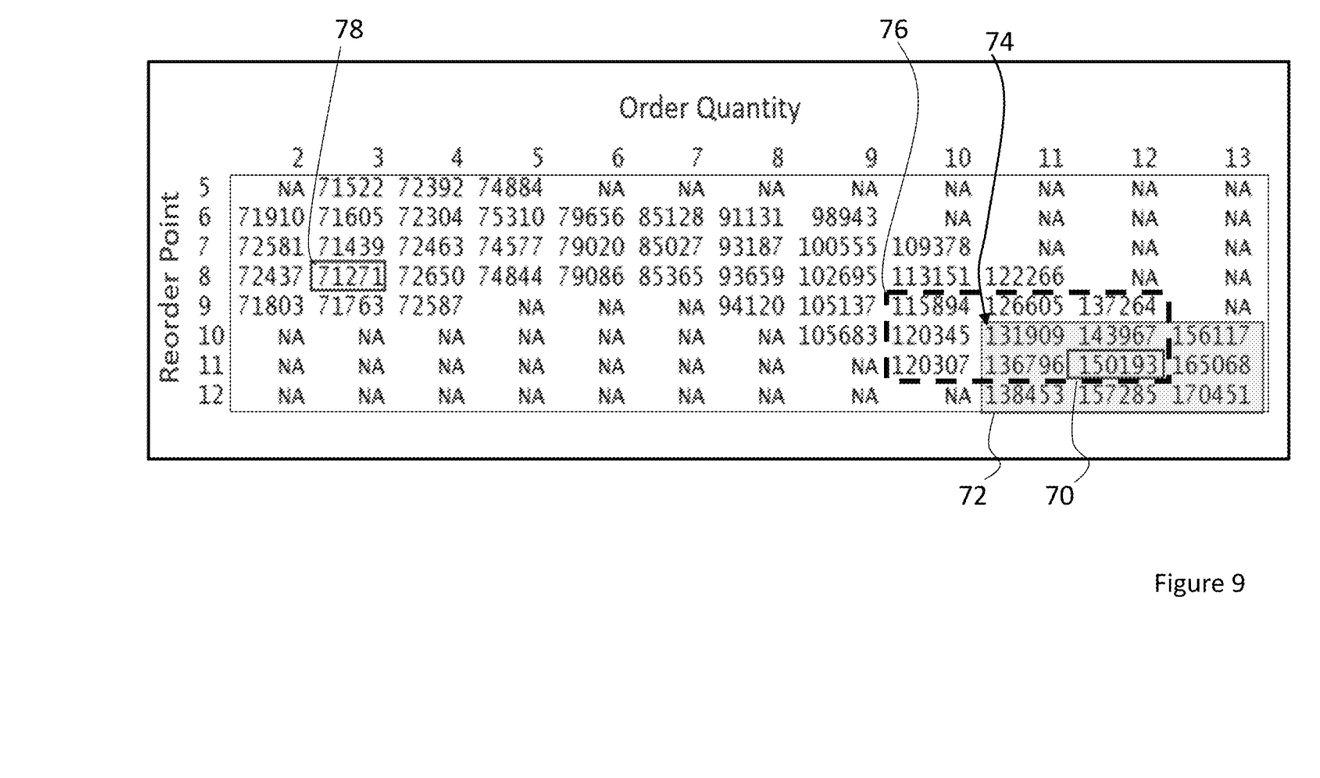
FIG. 9 shows the progression of a local search algorithm through a two-dimensional design space in accordance with an embodiment of the invention.

Analysis of these plots allows computation of all performance metrics over a given period of simulated operation, such as one year. Because each bootstrapped demand sequence is different, a unique performance metric is calculated for each sequence. An estimate of the performance metric may be made by averaging results for a number of sequences. In the example of FIG. 9, an initial selection 70 of CP value set (11, 12) results in a composite performance metric of 150,193, which is the predicted operating cost averaged over all simulations.

A planner could use the two processes above (advanced bootstrap process 26 and performance prediction process 28) to assess the performance of any particular design (i.e., Reorder point and Order Quantity CP values). However, in the present approach, optimization of the selection process is achieved with the parameter improvement process 30, detailed in steps S5-S9 of FIG. 2. Parameter improvement process 30 automatically discovers an optimal CP value set for the resource being processed.

The parameter improvement process 30 solves a variant of a constrained optimization problem. The decision variables are the N control parameters. In one example, the objective function is to minimize the cost of managing the resource in the technology platform 21, e.g., the cost of maintaining excess server capacity in a data center, or the sum of holding, ordering and dealing with shortage costs in the case of an inventory system. The constraint may comprise a user-supplied lower limit on a service level metric, e.g., a cloud computing client should never have to wait more than five seconds for a server log in, or 95% of all spare parts demanded must available immediately from stock.

One approach for solving this problem includes several steps with reference to FIGS. 2 and 9:

1. Identify an initial feasible solution, i.e., an initial CP value set. This initial solution should satisfy the service level constraint. In FIG. 9, as noted, the initial CP value set (11, 12) is marked by a rectangle 70 at Reorder Point=11 and Order Quantity=12.
2. Evaluate/predict a performance metric at S4. The initial solution is evaluated using the performance prediction process 28 for a number of demand sequences generated by the advanced bootstrap process 26. The performance of the proposed solution is assessed by averaging the operating costs across these demand sequences. In FIG. 9, as noted, the average operating cost is 150,193 for the initially selected CP value set of (11, 12). Note that at this point, the only calculated metric in the two-dimensional solution space (i.e., table shown in FIG. 9) would be for the initial CP value set 70. The remainder of the table would be blank or filled with NAs as shown.
3. Next at S5, the CP value sets neighboring the initially selected CP value set are identified, which as shown in FIG. 9 includes eight neighbors and the initial selection that together make up a neighborhood 72. At S6, the performance for each neighbor is predicted using the described bootstrap 26 and prediction processes 28. As shown in FIG. 9, the results of the evaluation of all eight neighboring solutions are depicted in the shaded area 72. Note that at this point, only the shaded area, neighborhood 72, would have calculated values in the table.
4. At S7, if the solution provided by the initially selected CP value set at the center of the neighborhood 72 has the best performance metric (e.g., lowest cost), then the initially selected CP value set is utilized at S8 for the resource and the process ends. Otherwise, at S9, the neighbor within the current neighborhood 72 with the best performance metric is selected, e.g., the neighbor with the lowest average operating cost. In FIG. 9, the upper left CP value set 74 (Reorder Point=10, Order Quantity=11) provides the lowest cost (131,909) of the nine in the neighborhood 72, so the CP value set (10, 11) is selected to become the center of a new neighborhood 76, which is denoted by the dotted rectangle.
5. The process then returns to S5 of FIG. 2 and repeats until a neighborhood is discovered in which the center of the neighborhood provides the best performance.

FIG. 9 shows a final set of evaluated solutions (i.e., CP value sets) and their average operating costs (i.e., performance metric). In this case, the selection of neighborhoods drifts to the "Northwest" then to the "Southwest", finally coming to rest at Reorder Point=8 and Order quantity=3.

Since this solution 78 is the lowest average operating cost in its neighborhood (71,271), solution 78 is the optimized CP value set (8, 3).

Once the optimized CP value set is determined for a selected resource, e.g., (8, 3) in the above example, the CP value set is fed to the automated process 20 shown in FIG. 1, which is utilized to manage aspects of the selected resource.

The optimization process accordingly begins with an initial solution (i.e., an initially selected CP value set and associated performance metric) to selectively search an N-dimensional solution space for an optimal solution, i.e., perform a local search from a starting point. Other processes could likewise be used to selectively search the solution space. For example, multiple random starting points could be utilized in performing the search and larger/smaller/different neighborhood structures could be used when identifying better solutions.

Figure 10:
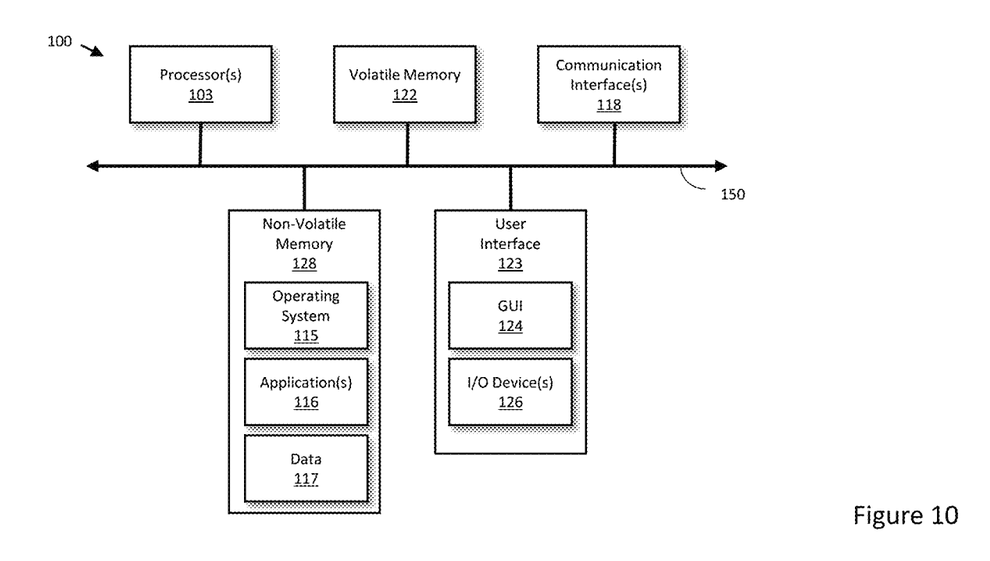
FIG. 10 depicts a computing system in accordance with an embodiment of the invention.

FIG. 10 depicts a block diagram of a computing device 100 useful for practicing an embodiment of system 10. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute on one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A system, comprising:
 a memory; and
 a processor coupled to the memory and configured to process demand data for a set of resources according to a method that includes:
  collecting demand sequences, wherein each demand sequence is associated with a resource managed by a technology platform;
  processing a demand sequence for a selected resource to calculate an optimized control parameter (CP) value set adapted to manage an automated process within the technology platform, wherein calculating the optimized CP value set for the selected resource includes:
   processing the demand sequence to generate a collection of bootstrapped demand sequences, wherein the bootstrapped demand sequences are generated with a bootstrap process that includes:
    detecting a trend in the demand sequence, wherein detecting includes differentiating between a mild trend or a strong trend;
    in response to a detected mild trend, utilizing a shifted resampling probability distribution to generate a collection of bootstrapped demand sequences; and
    in response to a detected strong trend, adding values to a beginning or end of a demand distribution and changing resampling probabilities to generate a collection of bootstrapped demand sequences;
   processing the bootstrapped demand sequences with a performance prediction process that models the automated process to predict a performance metric for an initially selected CP value set;
   identifying a neighborhood of CP value sets that includes neighbors and the initially selected CP value set;
   predicting the performance metric for each neighbor with the performance prediction process; and
   identifying from the neighborhood of CP value sets the optimized CP value set that provides a best performance metric.

2. The system of claim 1, wherein calculating the optimized CP value set further includes:
 determining whether the initially selected CP value set provides the best performance metric; and
 in response to determining that the initially selected CP value set does not provide the best performance metric, evaluating a new neighborhood of CP value sets that neighbor and include the optimized CP value set with the performance prediction process to identify a further optimized CP value set that provides the best performance metric within the new neighborhood.

3. The system of claim 1, wherein the performance prediction process uses a Monte Carlo simulation that models the automated process.

4. The system of claim 1, wherein the performance metrics calculated for all bootstrapped demand sequences for a selected CP value set are averaged to provide a composite performance metric.

5. The system of claim 1, wherein the CP value set includes a pair of parameters that includes at least one of: (Reorder Point, Order Quantity), (Min, Max) or (Review Interval, Order-up-to Level).

6. The system of claim 1, wherein the set of resources are selected from a group consisting of: computing resources, energy resources, web resources, communication resources, physical or virtual components, autonomous vehicles, units of inventory, or Stock Keeping Unit (SKU) identifiers.

7. The system of claim 1, wherein the technology platform is selected from a group consisting of: a cloud computing system, a communication network, a computer network, a control system, a machine, an autonomous vehicle fleet management system, an enterprise resource planning system, or an inventory management service.

8. The system of claim 1, wherein the performance metric includes a cost value.

9. A method for processing demand data for a set of resources in a technology platform, comprising:
collecting demand sequences, wherein each demand sequence is associated with a resource managed by a technology platform;
processing a demand sequence for a selected resource to calculate an optimized control parameter (CP) value set adapted to manage an automated process within the technology platform, wherein calculating the optimized CP value set for the selected resource includes:
processing the demand sequence to generate a collection of bootstrapped demand sequences, wherein the bootstrapped demand sequences are generated with a bootstrap process that includes:
detecting a trend in the demand sequence, wherein detecting includes differentiating between a mild trend and a strong trend;
in response to a detected mild trend, utilizing a shifted resampling probability distribution to generate a collection of bootstrapped demand sequences; and
in response to a detected strong trend, adding values to a beginning or end of a demand distribution and changing resampling probabilities to generate a collection of bootstrapped demand sequences;
processing the bootstrapped demand sequences with a performance prediction process that models the automated process to calculate
the optimized CP value set that provides a best performance metric.

10. The method of claim 9, wherein calculating the optimized CP value set further includes:
predicting a performance metric for an initially selected CP value set
identifying a neighborhood of CP value sets that includes neighbors and the initially selected CP value set;
predicting the performance metric for each neighbor with the performance prediction process; and
identifying from the neighborhood of CP value sets the optimized CP value set that provides a best performance metric.

11. The method of claim 10 wherein calculating the optimized CP value set further includes:
determining whether the initially selected CP value set provides the best performance metric; and
in response to determining that the initially selected CP value set does not provide the best performance metric, evaluating a new neighborhood of CP value set that neighbor and include the optimized CP value set with the performance prediction process to identify a further optimized CP value set that provides the best performance metric within the new neighborhood.

12. The method of claim 9, wherein the performance prediction process uses a Monte Carlo simulation that models the automated process.

13. The method of claim 9, wherein the performance metrics calculated for all bootstrapped demand sequences for a selected CP value set are averaged to provide a composite performance metric.

14. The method of claim 9, wherein the set of resources are selected from a group consisting of: computing resources, energy resources, web resources, communication resources, physical or virtual components, autonomous vehicles, units of inventory, or Stock Keeping Unit (SKU) identifiers.

15. The method of claim 9, wherein the technology platform is selected from a group consisting of: a cloud computing system, a communication network, a computer network, a control system, a machine, an enterprise resource planning system, an autonomous vehicle fleet management system, or an inventory management service.

16. A method for processing demand data for a set of resources in a technology platform, comprising:
collecting demand sequences, wherein each demand sequence is associated with a resource managed by a technology platform;
processing a demand sequence for a selected resource to calculate an optimized control parameter (CP) value set usable as inputs to manage an automated process within the technology platform, wherein calculating the optimized CP value set for the selected resource includes:
processing the demand sequence to generate a collection of bootstrapped demand sequences, wherein the bootstrapped demand sequences are generated with a bootstrap process that includes:
detecting a trend in the demand sequence, wherein detecting includes differentiating between a mild trend and a strong trend;
in response to a detected mild trend, utilizing a shifted resampling probability distribution to generate a collection of bootstrapped demand sequences; and
in response to a detected strong trend, adding values to a beginning or end of a demand distribution and changing resampling probabilities to generate a collection of bootstrapped demand sequences;
processing the bootstrapped demand sequences with a performance prediction process that models the automated process to predict an associated performance metric for an initially selected CP value set; and
utilizing the initially selected CP value set and the associated performance metric as an initial solution to selectively search an N-dimensional solution space for an optimal solution, wherein N is a number of control parameters in the solution space.

17. The method of claim 16, wherein selectively searching the N-dimensional solution space for the optimal solution includes:
identifying a neighborhood of CP value sets that includes neighbors and the initially selected CP value set;
predicting the performance metric for each neighbor with the performance prediction process; and
identifying from the neighborhood of CP value sets the optimized CP value set that provides a best performance metric.

* * * * *